(Model.)
S. FLORSHEIM.
FASTENING FOR GLOVES, SHOES, &c.
No. 262,215. Patented Aug. 8, 1882.
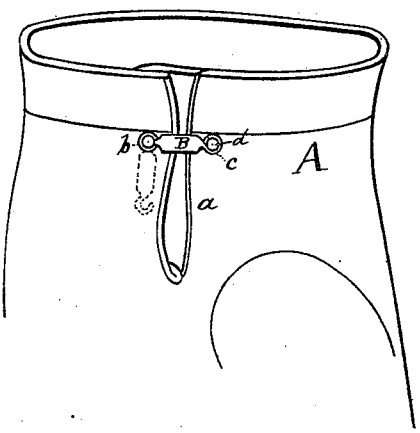
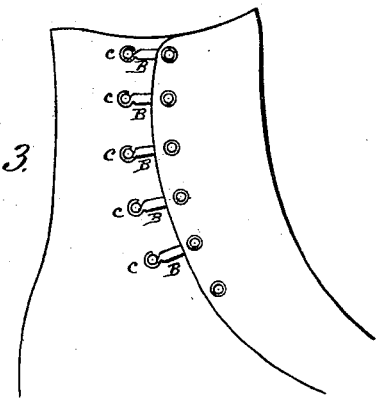
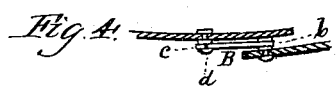
Witnesses.
F. B. Townsend
F. W. Kasehagen
Inventor.
Simon Florsheim
By Wm. H. Lotz
Attorney

UNITED STATES PATENT OFFICE.

SIMON FLORSHEIM, OF CHICAGO, ILLINOIS.

FASTENING FOR GLOVES, SHOES, &c.

SPECIFICATION forming part of Letters Patent No. 262,215, dated August 8, 1882.

Application filed May 24, 1881. (Model.)

*To all whom it may concern:*

Be it known that I, SIMON FLORSHEIM, of Chicago, in the county of Cook and State of Illinois, have invented a certain new and useful Improvement in Fastenings for Gloves and Shoes, of which the following is a specification.

This invention relates to devices for fastening the wrists of gloves and flaps of shoes and other garments; and the object of the invention is to produce a cheap, simple, and ready fastening, which is particularly well adapted for gloves or mittens made of heavy material.

My invention consists of devices and combinations of devices employed by me, as hereinafter described, and pointed out by the claim.

In the accompanying drawings, forming part of this specification, Figure 1 represents an elevation of the wrist portion of a glove having my fastening; Fig. 2, a sectional edge view of the same. Fig. 3 represents an elevation of the upper of a shoe with my fastenings attached; Fig. 4, a sectional edge view of the same; and Fig. 5 is an enlarged elevation of the fastening detached.

Like letters denote corresponding parts in all the figures.

A denotes the wrist of a glove, and $a$ the split portion of the same.

B is a link, made of sheet metal or other stiff material, which at end $b$ is provided with an eye for securing the same by a rivet or other means to the glove material, and at end $c$ said link has a hook that engages with a stud, $d$, secured to the material at the opposite edge of the wrist-split. The hook $c$ is formed of a loop that is central with the eye $b$ of the opposite end of the link, whereby when the fastening is closed the rivet and stud heads will show off symmetrically, and the edge of the link leading into said hook is formed on a diagonal line.

After the glove is drawn on one hand the edges or flaps of the wrist are drawn together with the thumb and middle finger of the other hand, and at the same time with the forefinger the hook $c$ is pushed over the shank of the stud, when the hook will engage at once, will keep the wrist closely fitting on the hand, and cannot open again by itself. This manipulation of closing the fastening can be accomplished with great ease by one hand to the other, no matter if the fingers are stiff cold, or if they are covered by a heavy glove or mitten.

For opening the fastening again all that is necessary is to contract the flaps or edges of the glove, when the diagonal edge under the hook, coming in contact with the shank of the stud, will shift the hook clear off and away from the stud without any further assistance by the hand.

As the dotted lines in Fig. 1 show, the hook engages from the finger end of the glove, which is handier for operating the fastening than if the link would have to be moved toward the finger end.

I prefer to secure the fastening-link to the material by a rivet, that being the cheapest, strongest, and simplest device; but it could also be fastened by thread or by a small staple, and a staple might be put in place of the stud for the hook to engage with, without changing the operation of the device. Such modifications I consider within the scope of my invention.

This fastening, when applied to shoes, may either be secured in the same manner as shown and described for gloves or mittens, or in the manner shown by Figs. 3 and 4, with the hook-links secured under one flap and engaging with studs projecting from the other flap.

As will be noticed, this fastening is very simple and convenient for use, even with gloves, mittens, or shoes made of the heaviest material, and it will give a rich and ornamental appearance to the garments to which it is applied.

I am aware that shoe-fastenings have been constructed by pivoting together a hook and a mousing-plate, one being adapted to be attached to the shoe-flap, the other movable and provided with a lug for holding the parts locked together; and I do not broadly claim the securing together of the flaps of shoes or the open parts of gloves or mittens by means of a hook and stud.

What I claim as my invention is—

A fastening for gloves, mittens, or shoes, consisting of a link, B, having at one end an eye, b, for pivotally securing said link directly to the material by a rivet, and having at the other end, central with the eye b, a hook, c, to engage with a stud, d, also secured to material, the edge of the link leading into said hook being formed in a diagonal line to facilitate the disengagement of the hook from the stud, and the hook c being secured to the glove to engage from the finger end of the glove, substantially as shown and described.

SIMON FLORSHEIM.

Witnesses:
F. W. KASEHAGEN,
E. H. FROMMANN.